United States Patent [19]
Wahls

[11] Patent Number: 5,601,338
[45] Date of Patent: Feb. 11, 1997

[54] SEAT STRUCTURE WITH ADJUSTABLE SUSPENSION

[75] Inventor: Robert J. Wahls, Pinckney, Mich.

[73] Assignee: Michigan Seat Company, Jackson, Mich.

[21] Appl. No.: 408,942

[22] Filed: Mar. 23, 1995

[51] Int. Cl.⁶ ........................................................ A47C 3/32
[52] U.S. Cl. ................... 297/313; 297/284.11; 297/339; 297/463.1; 297/452.55; 297/320; 297/332; 116/285; 116/303
[58] Field of Search ............................. 297/284.1, 284.2, 297/313, 284.11, 339, 452.18, 452.23, 452.55, 452.57, 463.1, 463.2, 320, 332; 116/285, 284, 303

[56] References Cited

U.S. PATENT DOCUMENTS

| | | | |
|---|---|---|---|
| 974,769 | 11/1910 | Hoff | 297/332 |
| 1,025,915 | 5/1912 | Hoff | 297/332 |
| 2,395,730 | 2/1946 | Farkas | 243/54 |
| 2,531,572 | 11/1950 | Knoedler | 155/9 |
| 2,840,140 | 6/1958 | Harrington | 155/51 |
| 3,178,221 | 4/1965 | Schwarz | 297/284.1 |
| 3,301,520 | 1/1967 | Barth et al. | 297/333 |
| 3,743,230 | 7/1973 | Freedman | 248/399 |
| 4,640,488 | 2/1987 | Sakamoto | 248/588 |
| 4,687,250 | 8/1987 | Esche | 297/320 |
| 4,712,834 | 12/1987 | Warrick | 297/284.2 |
| 4,781,417 | 11/1988 | Shipman et al. | 297/452.55 X |
| 4,890,887 | 1/1990 | Koutsky et al. | 297/320 |

*Primary Examiner*—Peter M. Cuomo
*Assistant Examiner*—Stephen Vu
*Attorney, Agent, or Firm*—Duncan F. Beaman

[57] ABSTRACT

A seat particularly suitable for industrial applications having a hinged bottom supported upon springs for adjustably resiliently supporting the occupant to absorb vibrations and impact. The springs impose a resilient biasing force upon the seat bottom structure and a conveniently located adjusting knob selectively positions the location of the application of the biasing force with respect to the seat bottom hinge. Accordingly, by adjusting the location of application of the biasing force, the suspension characteristics of the seat bottom may be controlled and preselected with minimum manual exertion and no spring pre-tensioning or pre-compression is required to vary the suspension characteristics.

15 Claims, 4 Drawing Sheets

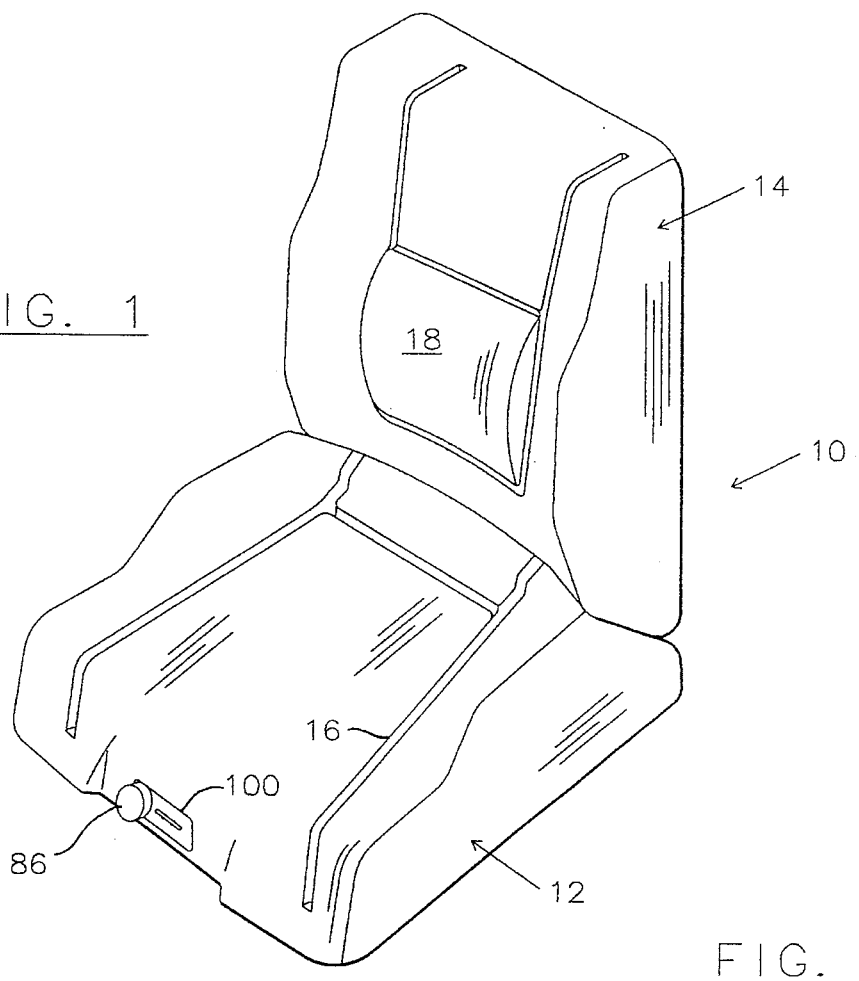
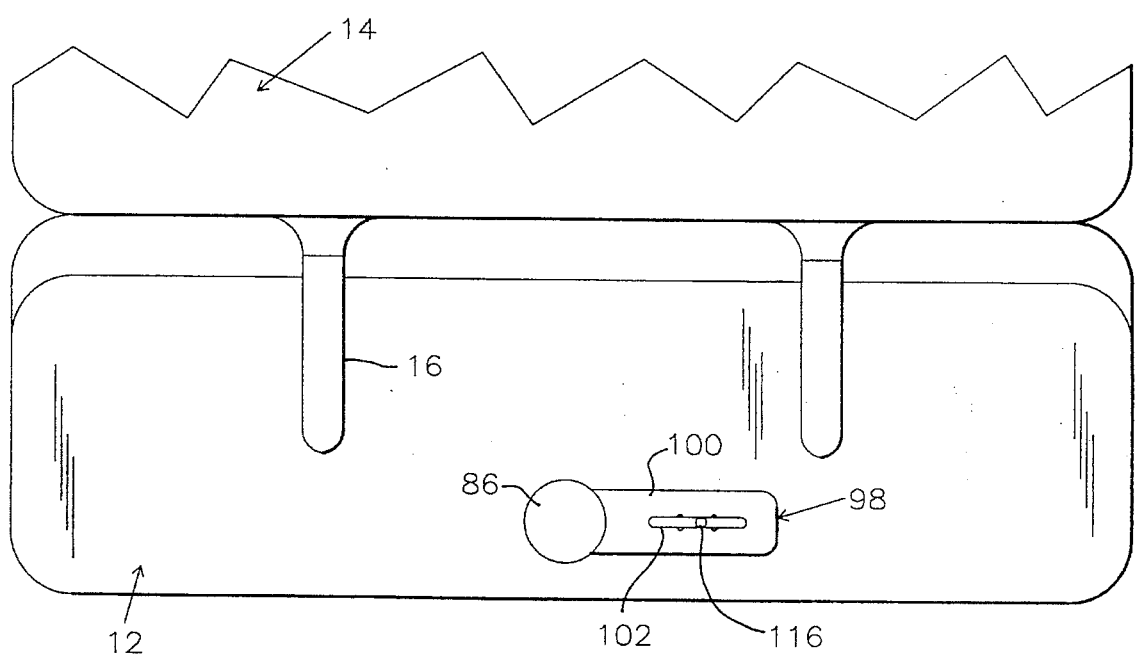

SEAT STRUCTURE WITH ADJUSTABLE SUSPENSION

BACKGROUND OF THE INVENTION

1. Field of the Invention

The invention pertains to seat structure including a seat bottom supported by a resilient spring biasing force wherein the suspension characteristics of the seat bottom are adjustably determined by varying the value of the biasing force imposed upon the seat bottom.

2. Description of the Related Art

The riding characteristics of vehicle seats, particularly seats utilized with industrial equipment such as tractors, trucks, lift trucks, construction equipment, and the like, have long used spring supported seat bottoms to absorb vibrations, jolts and impacts to improve the comfort of the occupant. Such seat bottoms may be totally supported upon springs, or spring biased linkages, or the seat bottoms may be hinged to a frame at one location and supported by springs at a location remote from the hinge wherein vertical displacement of the seat bottom remote from the hinge is possible to improve the seat's riding characteristics.

Because the weight of a seat occupant may vary by many pounds, such as 150 pounds or more, it is common with spring supported seat bottoms to provide means for adjusting the biasing force imposed upon the seat bottom by the springs in order to provide the shock absorbing and seat movement desired for each weight of occupant. Such adjusting structure usually consists of mechanisms, usually screw operated, which impose a pre-compression or pre-tensioning force upon the seat springs to vary the modulus of elasticity of the spring, either the extension or compression of the spring, depending on the type of spring that is used. Such pre-compression or pre-tensioning of the spring will Change the spring length and affects the operating characteristics of the spring, limiting the seat movement, and further, pre-compression or tensioning of a seat spring to increase its resistance to deflection in order to accommodate a heavier occupant reduces the shock absorbing characteristics of the spring and provides an undesirably high "stiffness" to the seat.

Another disadvantage of spring suspension seats having adjustable biasing force devices arises from the high manual forces required to pre-tension or pre-compress the seat springs, and as such pre-tensioning or compression is accomplished manually, high manual forces must be imposed upon the adjusting structure to achieve the desired spring setting.

OBJECTS OF THE INVENTION

It is an object of the invention to provide a seat having an adjustable spring supported suspension wherein adjustment of the spring produced biasing force as imposed upon the seat bottom is produced by varying the location of the application of the biasing force upon the seat rather than pre-stressing the springs.

Another object of the invention is to provide a spring supported seat suspension for a seat bottom pan hinged to a frame wherein the location of the application of the spring produced biasing force relative to the seat pan hinge may be readily adjusted to vary the characteristics of the seat suspension.

An additional object of the invention is to provide a spring suspension for a seat bottom pan hinged to a frame wherein the location of the biasing force relative to the hinge may be readily manually adjusted, and the setting of the suspension system to accommodate a particular weight of occupant is readily visible.

Yet another object of the invention is to provide a spring supported seat suspension system wherein the force imposed by the springs upon the seat bottom are adjusted by varying the location of the biasing force upon the seat bottom, and indicating structure associated with the adjusting mechanism visually indicates the setting of the suspension system to accommodate a particular occupant weight.

SUMMARY OF THE INVENTION

In the preferred embodiment of the invention, a seat pan, which supports a seat bottom cushion, is mounted upon a metal frame which, in turn, is mounted upon support structure, such as a vehicle deck, pedestal apparatus, or the like. The seat pan is pivotally mounted to the frame front rail by a pair of spaced hinges or pivots wherein the rear portion of the seat pan is capable of vertical displacement. A lever arm which is in the form of a U configuration having parallel legs interconnected by a base portion is pivotally mounted to frame rear structure at the lever arm legs wherein the lever arm is capable of pivoted vertical movement relative to the frame. The seat bottom pan rear portion is supported upon the lever arm base.

A pair of tension springs are mounted in spaced relation on the seat back or on a bracket at a vertical elevation with respect to the seat pan rear portion, and the lower ends of the springs are connected to a slide which is mounted upon the lever arm legs. The slide is slidably positionable along the lever arm legs, and as the spring biasing force is exerted on the lever arm through the slide, the location of the biasing force upon the lever arm is dependent upon the position of the slide on the lever arm.

The position of the slide upon the lever arm is adjusted by an elongated yoke located adjacent the frame front rail. The yoke is interconnected to the slide by a flexible cable located at each yoke end which is also attached to an end of the slide. A threaded rod supports the yoke, and an accessible knob mounted upon the threaded rod permits the rod to be rotated which moves the yoke in a generally horizontal direction adjusting the position of the yoke and slide. Rotation of the threaded rod to draw the yoke toward the frame front rail tensions the cables and pulls the slide toward the lever arm base and seat pan hinges to increase the torque arm of the application of the spring force to the lever arm. Rotating the threaded rod in a direction to move the yoke toward the slide releases the tension in the cables and permits the slide to move along the lever arm legs in the opposite direction toward the lever arm leg fulcrums due to the biasing force of the springs which has a vector along the lever arm legs toward the associated fulcrums.

Accordingly, manual rotation of the threaded rod by its knob will adjust the location of the slide upon the lever arm legs which increases or decreases the distance that the spring produced biasing force is imposed upon the lever arm with respect to the lever arm fulcrums. This positioning of the slide upon the lever arm determines the value of the biasing force imposed upon the lever arm which, in turn, varies the biasing force imposed upon the seat pan rear portion by the lever arm, and permits the characteristics of the seat suspension to be varied and predetermined.

Because the force required to rotate the threaded rod to displace the yoke and slide is relatively small, needing only to overcome the friction of the slide and the rearward biasing force vector of the springs, adjustment of the characteristics of the seat suspension system are achieved with a minimum of manual exertion.

In order to provide a visual indication of the adjusted characteristics of the seat suspension system, a readily visible indicator is located upon the seat structure adjacent the threaded rod adjusting knob. This indicator includes a biased lever wherein one portion of the lever moves within a visible slot and indicia adjacent the slot may be used to indicate the approximate weight for which the suspension system is set to accommodate. The other end of the indicator lever engages the yoke such that the position of the yoke determines the position of the indicator lever, and as the yoke position is directly related to the slide position on the lever arm, an accurate indication of the setting of the suspension system is achieved.

The spring suspension system of the invention may be adapted to accommodate a variety of seat configurations having either fixed or adjustable backs, and the apparatus practicing the invention can be concisely fitted within conventional seat configurations without significantly adding to the bulk or exterior dimensions thereof.

BRIEF DESCRIPTION OF THE DRAWINGS

The aforementioned objects and advantages of the invention will be appreciated from the following description and accompanying drawings wherein:

FIG. 1 is a perspective view of a fully assembled adjustable seat in accord with the invention, FIG. 2 is an enlarged detail front elevational view of the seat bottom cushion of FIG. 1.

DESCRIPTION OF THE PREFERRED EMBODIMENT

Figure 3:
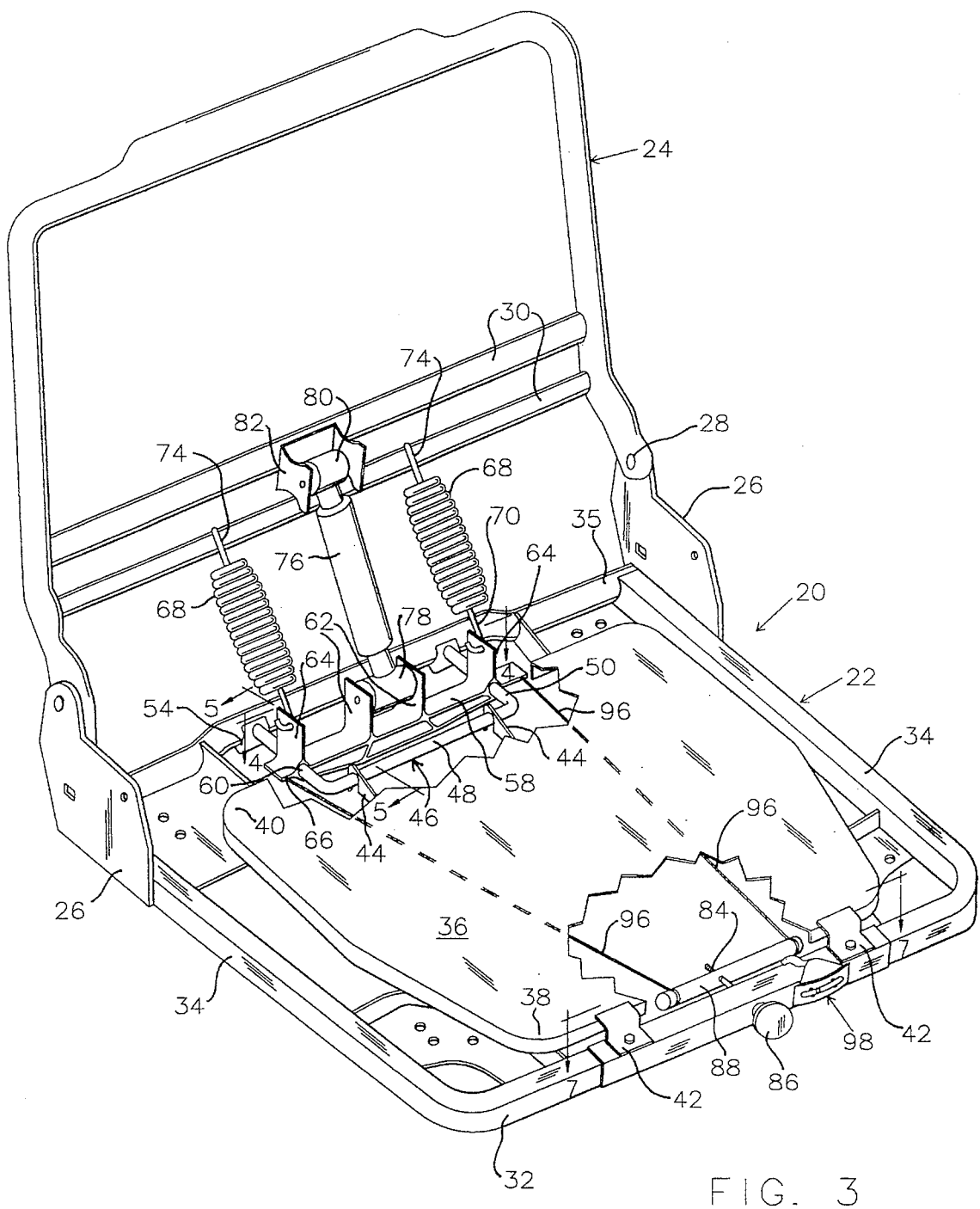
FIG. 3 is a perspective view illustrating the frame, seat pan and operating components of an adjustable seat in accord with the invention.
Figure 4:
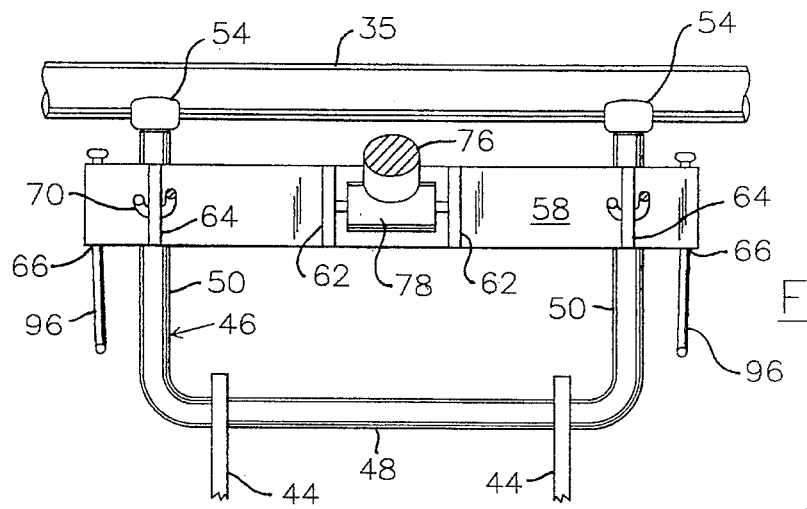
FIG. 4 is a top plan detail view of the lever arm slide as taken along Section 4—4 of FIG. 3.

With reference to FIG. 1, a seat incorporating the concepts of the invention is generally indicated at 10 and includes a bottom cushion 12 and a back cushion 14. The cushions 12 and 14 may be conventionally formed of foam encased within a flexible vinyl cover, or the like, as is well known in the seat art. The cushions usually include molded recesses 16 for decorative and occupant fitting purposes, and the back cushion 14 may include a lumbar region 18 wherein an adjustable lumbar device may be mounted, not shown. The back cushion 14 may be capable of tilting relative to the seat cushion 12, and in such event, conventional tilting and holding apparatus may be employed. The type of seat back tilting mechanism, or lumbar adjusting mechanism, which may be utilized with the seat 10 constitutes no part of the instant invention.

As shown in FIG. 3, the support for the cushions 12 and 14 constitutes a metal frame generally indicated at 20, and the frame includes a seat frame 22 upon which the cushion 12 is supported, and a back frame 24 upon which the back cushion 14 is mounted. Side plates 26 affixed to the seat frame 22 may support pivots 28 upon which the back frame 24 is mounted for tiltable positioning by the back tilting mechanism, not shown. Cross members 30 are mounted upon the back frame 24 extending across the width thereof.

The seat frame 22 includes a front rail 32 from which depend parallel side rails 34 interconnected at their rear end by the rear bar 35. The seat frame 22 constitutes the support for the seat pan 36 which is formed of a sheet material, usually metal, and constitutes the primary support for the seat bottom cushion 12. The pan 36 occupies a majority of the area between the seat frame rails and includes a front portion 38 adjacent the front rail 32, and a rear portion 40 adjacent the rear bar 35.

The pan 36 is pivotally mounted upon the frame 22 at its front portion 38 by hinge structure located at 42 mounted upon the front rail 32. The mounting of the pan 36 upon the front rail 32 by hinges permits the pan rear portion 40 to be vertically displaceable, and as the majority of the weight of the seat occupant is carried by the rear portion of the pan 36, the hinged mounting of the pan permits the major portion of the occupant weight to be supported by the vertically displaceable portion of the pan and bottom cushion 12.

The rear portion of the pan 36 is supported by a spring biasing force, as later described, and this biasing force is applied to a pair of support brackets 44 mounted to the underside of the pan rear portion 40, FIGS. 3, 5 and 6, as described below.

A lever arm 46 of a U shaped configuration is pivotally mounted upon the frame rear bar 35. The configuration of the lever arm 46 includes a base 48 from which a pair of spaced parallel linear legs 50 extend. The outer ends of the legs 50 are of a reduced dimension 52 and are pivotally and slidably supported within fulcrum brackets 54 mounted upon the underside of the rear bar 35.

Figure 5:
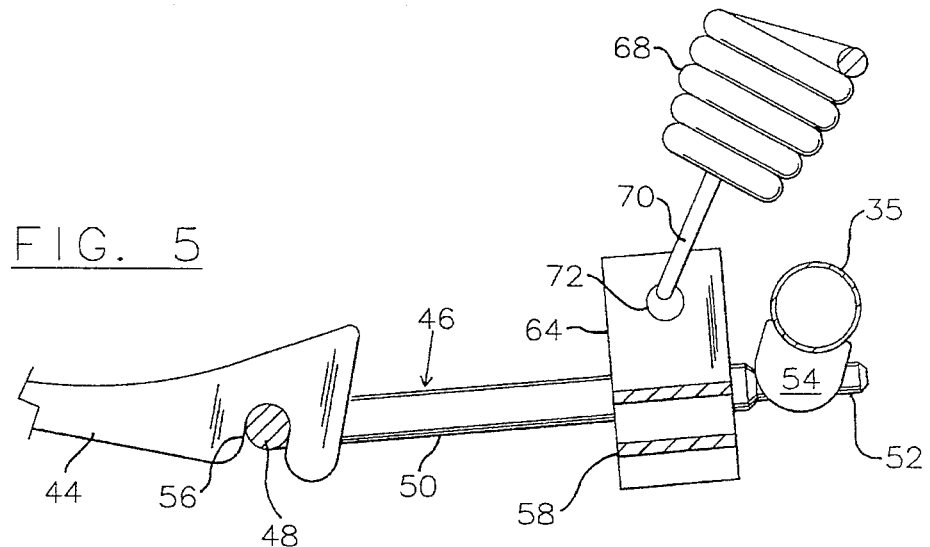
FIG. 5 is an enlarged, detail, elevational view illustrating the lever arm, slide and seat pan rear portion, with the slide located at its minimum torque arm position as taken along Section 5—5 of FIG. 3.
Figure 6:
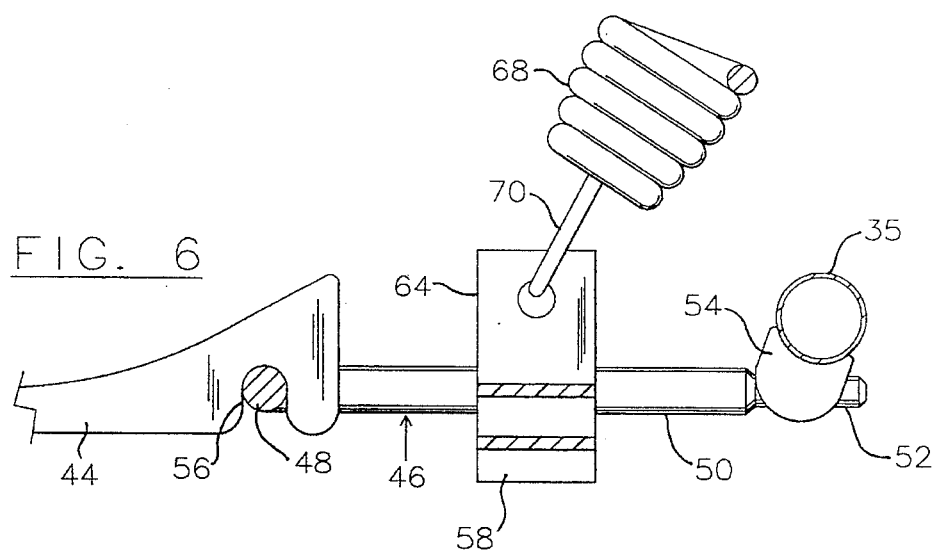
FIG. 6 is an elevational sectional view similar to FIG. 5 illustrating the slide in a partially extended position upon the lever arm.

As shown in FIGS. 5 and 6, the underside of the pan support brackets 44 each include a notch 56 which receives the base 48 of the lever arm 46, and in this manner upward force imposed upon the lever arm 46 as to raise the base 48 will impose an upward force upon the pan rear portion 40.

A slide 58, which is molded of a strong synthetic material, is slidably mounted upon the lever arm legs 50. The slide 58 includes holes 60 in which bearings are preferably located wherein the slide 58 is mounted upon the lever arm 46 for slidable movement toward the frame rear bar 35 or toward the seat bottom support brackets 44. A pair of ears 62 are defined upon the slide 58 extending upwardly in spaced relationship, and adjacent the ends of the slide 58 spring anchor bosses 64 are defined thereon and extend upwardly. At the ends of the slide 58, a cable slot or recess 66 is defined for receiving a cable as later described.

A pair of tension springs 68 are imposed between the slide 58 and the back frame 24. Each of the springs 68 includes a hooked lower end 70 received within a hole 72 defined within a slide spring anchor boss 64. The upper ends of the springs 68 each include a hooked end 74 which is hooked over a cross member 30 of the back frame 24 but the ends 74 could be mounted on brackets attached to seat frame 22. An oil or air operated shock absorber or vibration damper 76 includes a lower end 78 mounted between the slide ears 62 by a pivot pin, and the upper end 80 of the damper 76 is pivotally mounted to the back frame 24 by a bracket 82 attached to a cross member 30.

From the aforedescribed relationship of components, it will be appreciated that the tension springs 68 will impose an upward biasing force upon the slide 58, and this force is transferred to the seat bottom pan 36 adjacent the rear portion 40 by the reception of the lever arm base 48 within the notches 56 of the seat pan support brackets 44. The occupant's weight imposed upon the seat pan 36 will cause the springs 68 to extend and the occupant will be supported upon the resiliency of the springs.

The effective biasing force produced by the springs 68 is adjusted by the location of the slide 58 on the lever arm 46. Since the spring biasing force is imposed upon the lever arm 46 through the slide 58, the greater the distance of the slide 58 from the fulcrum brackets 54, the greater the torque arm of the lever arm 46 and the greater the biasing force imposed upon the lever arm 48, and hence upon the seat pan rear portion 40. The greater the distance of the slide 54 from the fulcrum brackets 58, the greater will be the effective torque arm of the spring biasing force on the lever arm 46 permitting a greater biasing force to be imposed upon the pan 36 for a given deflection of the springs 68.

As will be appreciated from FIGS. 3, 5 and 6, the location of the spring upper ends 74 as mounted upon the back frame 24 is "behind" the location of the lower spring ends 70, even when the slide 58 is adjacent the fulcrum brackets 54 shown in FIG. 5. Accordingly, this angular orientation of the springs 68 will produce a "rearward" force vector on the slide 58 biasing the slide toward the fulcrum brackets 54 and rear bar 35. The apparatus for displacing the slide 58 on the lever arm legs 50 against this rearward biasing produced by the springs 68 is described below.

A threaded rod 84 is rotatably mounted upon the seat frame front rail 32 in a horizontal and central position. The outer end of the threaded rod 84 is provided with a manually rotatable knob 86 located exteriorly of the bottom cushion 12 as will be appreciated from FIGS. 1 and 2.

Figure 7:
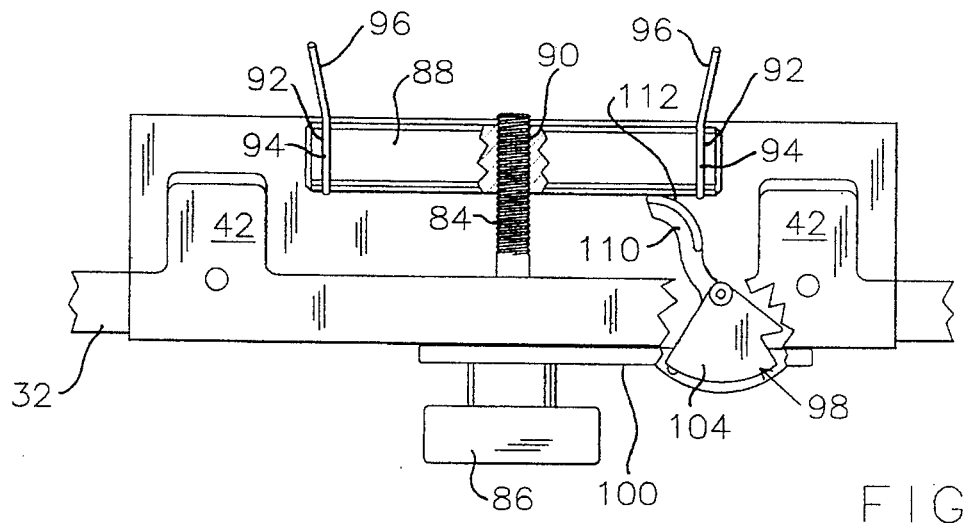
FIG. 7 is a plan, detail, partially sectional view of the frame front rail, yoke, adjusting rod, and yoke position indicator.

An elongated yoke 88 includes a central diametrically disposed threaded hole 90 for receiving the threaded rod 84, and the yoke 88 is located parallel to the frame front rail 32 as will be appreciated from FIGS. 3 and 7. Rotation of the knob 86 and rod 84 will displace the yoke 88 in a horizontal manner closer or further from the front rail 32. The yoke 88 includes a circumferential groove 92 located adjacent each yoke end, and a cable loop 94 is located within each yoke groove 92. A cable 96 is associated with each cable loop, and the flexible cables 96 extend under the seat bottom pan 36 wherein their rearward ends are received within the slide holes 60. Accordingly, rotation of the knob 86 and rod 84 will horizontally displace the yoke 88 toward and away from the slide 58, and this yoke movement is transferred to the slide by the cables 96. FIG. 6 represents a position of the slide 58 on the lever arm legs 50 wherein the yoke 88 has been positioned closer to the front rail 32 than is the case with the slide 58 as shown in the position of FIG. 5.

Accordingly, it will be appreciated that by rotation of the knob 86, the position of the slide 58 upon the lever arm 46 will be adjusted, and the torque arm of the application of the spring biasing force upon the lever arm 46 adjusted. Tensioning of the cables 96 by drawing the yoke 88 toward the front rail 32 will increase the effective torque arm of the application of the spring forces to the lever arm 46, while rotating the knob 86 and threaded rod 84 in a direction to displace the yoke 88 away from the frame front rail 32 tends to remove the tension within the cables 96, but the rearward biasing force imposed upon the slide 58 by the springs 68 will move the slide 58 toward the fulcrum back brackets 54 maintaining a minimum tension within the cables 96, and there will be no "slack" in the cables 96 or lost motion in the adjustment of the slide 58 on the lever arm 46.

As the slide 58 and lever arm 46 are not visible to the occupant, it is desirable to indicate to the seat user the present adjustment of the torque arm of the spring biasing force on the lever arm 46 and indicate to the user whether the adjustment is for a heavy or light individual. Indication of such adjustment of the spring biasing force to the apparatus is provided by the indicator 98 exteriorly located upon the seat 10 adjacent the knob 86.

Figure 8:
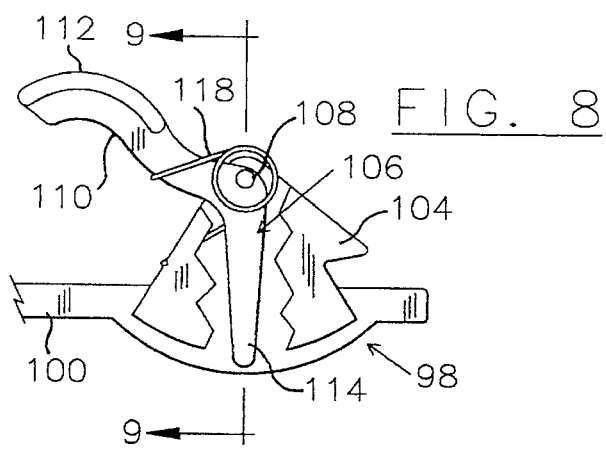
FIG. 8 is a plan enlarged, partial sectioned, detail view of the yoke position indicator.
Figure 9:
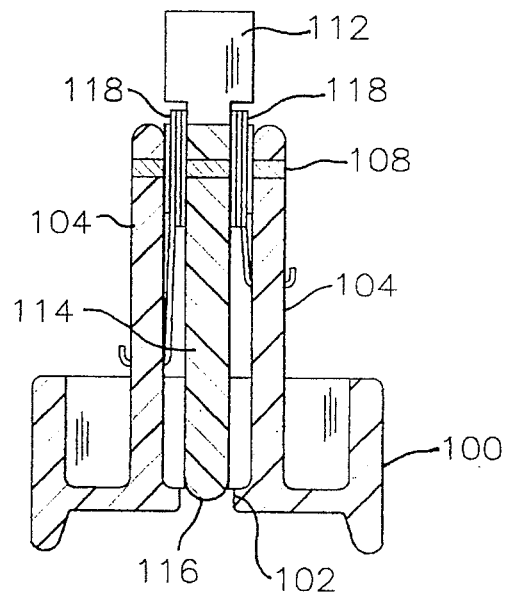
FIG. 9 is a sectional view through the yoke indicator as taken along Section 9—9 of FIG. 8.

The indicator 98 includes an indicator plate 100 located on the exterior of the bottom cushion 12 adjacent the knob 86. The indicator plate 100 includes an elongated slot 102 which is exteriorly visible. Indicator plate 100 may be molded of synthetic material, such as nylon or the like, and the indicator structure is mounted within the frame front rail 32. The indicator plate includes a pair of spaced parallel bosses 104 which extend rearwardly toward the yoke 88, and a first class lever 106 is mounted between the bosses 104 upon a pivot pin 108. One of the arms of the lever 106 constitutes a yoke engaging arm 110 having a convex yoke engaging surface 112 defined thereon. The other arm of the lever 106 constitutes a pointer arm 114 having an end 116 located within the slot 102, and the pointer arm end 116 is exteriorly visible to the operator as the knob 86 is rotated. Torsion springs 118 extending about the pivot pin 108 include ends engaging the indicator plate 100 and the lever 106 bias the lever 106 in a clockwise direction as viewed in FIGS. 7 and 8 which will cause the lever convex surface 112 to engage the front portion of the yoke 88 as shown in FIG. 7. As the threaded rod 84 is rotated by the knob 86 to horizontally displace the yoke 88, the position of the yoke will be sensed by the engagement thereof by the indicator lever arm surface 112, and the position of the yoke 88 will be indicated by the position of the lever arm end 116 within the slot 102. Accordingly, the operator need only glance at the slot 102 to know whether the slide 58 is adjusted to accommodate a heavier or lighter individual, and indicia may be formed on the indicator plate 100 adjacent the slot 102 indicating appropriate pointer arm end positions for heavier or lighter seat users.

Heavier individuals will want to position the slide 58 remotely from the fulcrum brackets 54 in order to increase the biasing force imposed upon the lever arm 46 and the seat pan 36, as shown in FIG. 6, while lighter individuals will position the slide 58 closer to the fulcrum brackets 54 as shown in FIG. 5. As the amount of torque applied to the knob 86 and threaded rod 84 is only that necessary to position the slide 58 upon the lever arm legs 50, the exertion required to adjust the seat of the invention is relatively small as compared to spring supported seats wherein adjustment for the weight of the individual is accomplished by pre-loading the springs by pre-compressing or pre-tensioning the spring force. The apparatus of the invention may be concisely located within the confines of the seat 10 and effective and yet easy-to-use adjustment is provided so that the seat biasing force is most effectively adjusted for the weight of the particular seat occupant.

It is appreciated that various modifications to the inventive concepts may be apparent to those skilled in the art without departing from the spirit and scope of the invention.

I claim:

1. An adjustable resilient supported seat comprising, in combination, a frame having a front rail and side rails having rear portions, said frame including a back support mounted upon said side rails' rear portions, a seat bottom pan having a front portion and a rear portion, hinge means attaching said pan front portion to said frame front rail permitting said pan rear portion to be vertically displaceable with respect to said frame side rails' rear portions, pan rear portion support means mounted on said frame, springs mounted upon said frame producing a resilient biasing force operatively associated with and supporting said pan rear portion support means and adjustment means mounted on said frame selectively adjusting the location of application of said resilient biasing force with respect to said hinge means and said pan rear portion support means to adjust the magnitude of said resilient biasing force upon said pan rear portion support means to vary the weight bearing characteristics of said seat bottom pan.

2. In an adjustable resiliently supported seat as in claim 1, said pan rear portion support means comprising a lever arm having a fulcrum and a length, said lever arm fulcrum being mounted on said frame, said seat bottom pan rear portion being supported by said lever arm at a location spaced from said fulcrum, said adjustment means applying said resilient biasing force to said lever arm at selected positions along said length of said lever arm to select the amount of said biasing force applied to said seat bottom pan.

3. In an adjustable resiliently supported seat as in claim 2, said adjustment means including a slide movably positionable on said lever arm, said resilient biasing force being connected to said slide whereby said biasing force is applied to said lever arm through said slide, and adjustable positioning means selectively positioning said slide upon said lever arm.

4. In an adjustable resiliently supported seat as in claim 3, at least one spring interposed between said frame and said slide producing said resilient biasing force.

5. In an adjustable resiliently supported seat as in claim 4, a pair of tension springs being interposed between said slide and said frame back support producing said resilient biasing force.

6. In an adjustable resiliently supported seat as in claim 3, said adjustable positioning means positioning said slide upon said lever arm including a threaded rod rotatably mounted on said frame, a manually operated knob mounted on said rod for rotating said rod, a yoke, said rod being threadably associated with said yoke, and operating elements connecting said yoke to said slide whereby rotation of said rod translates said yoke and operating elements to position said slide upon said lever arm.

7. In an adjustable resiliently supported seat as in claim 6, said operating elements comprising flexible cables.

8. In an adjustable resiliently supported seat as in claim 6, said threaded rod being rotatably mounted on said frame front rail.

9. In an adjustable resiliently supported seat as in claim 6, a biasing force indicator mounted upon said frame adjacent said front rail, said indicator being operatively connected to said yoke, said indicator providing a visual indication of the position of said yoke and thereby indicating the position of said slide upon said lever arm and the value of said biasing force upon said lever arm and said seat bottom pan rear portion.

10. In an adjustable resiliently supported seat as in claim 9, said biasing force indicator including a housing mounted upon said frame front rail, a lever pivotally mounted upon said housing at a pivot point and having a first portion located upon a first side of said pivot point and a second portion located upon the opposite side of said pivot point, said lever first portion engaging said yoke, said lever second portion constituting a visual indicator of the position of said lever, and a spring biasing said lever first portion into engagement with said yoke.

11. In an adjustable resiliently supported seat as in claim 10, a visible slot defined in said housing, said lever second portion including a free end, said lever second portion free end being movably located with said slot whereby the position of said lever first portion end within said slot may be visually ascertained to indicate the value of said biasing force upon said lever arm and said seat bottom pan rear portion.

12. An adjustable resiliently supported seat comprising, in combination, a frame, a seat bottom, a seat bottom hinge mounting said seat bottom upon said frame whereby a portion of said seat bottom spaced from said hinge is capable of vertical displacement, spring means mounted on said frame producing a resilient biasing force imposed upon said seat bottom at a location remote from said hinge, and slidable adjustment means mounted upon said frame selectively varying the effective distance of application of said resilient biasing force from said seat bottom hinge to adjust the weight bearing characteristics of said seat bottom.

13. In an adjustable resiliently supported seat as in claim 12, an indicator mounted upon said frame operatively connected to said adjustment means visually indicating the position of said adjustment means.

14. In an adjustable resiliently supported seat as in claim 12, said adjustment means including a lever arm pivotally mounted upon said frame, said seat bottom being supported by said lever arm at a location remote from said hinge, said resilient biasing force being applied to said lever arm.

15. In an adjustable resiliently supported seat as in claim 13, said adjustment means including a slide selectively positionable upon said lever arm, said resilient biasing force being applied to said slide.

* * * * *